United States Patent [19]
Rudnicki et al.

[11] Patent Number: 5,944,466
[45] Date of Patent: *Aug. 31, 1999

[54] CANTILEVER FASTENER ASSEMBLY

[75] Inventors: Edward S. Rudnicki, South Amboy; Salvatore J. Sisto, East Brunswick, both of N.J.

[73] Assignee: Pinnacle Innovations, South River, N.J.

[*] Notice: This patent is subject to a terminal disclaimer.

[21] Appl. No.: 08/939,450

[22] Filed: Sep. 29, 1997

Related U.S. Application Data

[63] Continuation-in-part of application No. 08/492,211, Jun. 19, 1995, abandoned, and a continuation-in-part of application No. 08/566,854, Dec. 4, 1995, abandoned.

[51] Int. Cl.[6] ...................................................... F16B 21/00
[52] U.S. Cl. ............................................. 411/344; 411/340
[58] Field of Search ..................................... 411/340, 344, 411/341, 342, 349, 345; 248/231.9, 314, 224.7

[56] References Cited

U.S. PATENT DOCUMENTS

| 1,962,289 | 6/1934 | Waldon . |
| 2,024,871 | 12/1935 | Parsons . |
| 2,235,078 | 3/1941 | Meisterhans . |
| 2,771,259 | 11/1956 | Laystrom . |
| 3,170,361 | 2/1965 | Vaughn . |
| 4,086,840 | 5/1978 | Kurlander . |
| 4,116,104 | 9/1978 | Kennedy . |
| 4,770,583 | 9/1988 | Lindberg . |
| 4,834,601 | 5/1989 | Schaap . |
| 4,859,127 | 8/1989 | Koch . |
| 4,971,500 | 11/1990 | Benoit et al. . |
| 5,051,047 | 9/1991 | Loncaric . |
| 5,163,796 | 11/1992 | Belser . |
| 5,186,427 | 2/1993 | Semchuck . |
| 5,193,961 | 3/1993 | Hoyle et al. . |
| 5,209,621 | 5/1993 | Burbidge . |
| 5,226,768 | 7/1993 | Speer . |
| 5,249,900 | 10/1993 | Mitts . |
| 5,294,225 | 3/1994 | Kazino et al. . |
| 5,308,204 | 5/1994 | Moen . |
| 5,316,422 | 5/1994 | Coffman . |
| 5,381,308 | 1/1995 | Wolpert et al. . |
| 5,425,609 | 6/1995 | Smith . |

FOREIGN PATENT DOCUMENTS

| 1084089 | 6/1960 | Germany . |
| 2845000 | 4/1980 | Germany . |
| 1536674 | 12/1978 | United Kingdom . |

Primary Examiner—Steven Meyers
Assistant Examiner—Teri Pham
Attorney, Agent, or Firm—Gottlieb, Rackman & Reisman, P.C.

[57] ABSTRACT

A fastener assembly which imparts, on a surface of a first structural element to be joined to a second structural element, joining forces at three or more radially equidistant regions isolated from the edge of an opening extending through the first structural element. An illustrative embodiment of the fastener assembly includes an apertured face plate, an anchoring assembly, and a positioner for causing relative axial movement between the face plate and the anchoring assembly. The anchoring assembly includes a base portion and a projecting portion that extends in an axial direction away from the base portion. The projecting portion of the anchoring assembly is sufficiently rigid as to restrict further movement of the base portion toward the face plate when the projecting portion initially contacts the first structural element, despite continued actuation of the positioner, and the projecting portion is sufficiently rigid as to prevent displacement of distal regions of the anchoring assembly from respective initial positions of contact with the radially equidistant regions on the first structural element—despite progressively increased exertion of a pulling force on the anchoring assembly by the positioner.

40 Claims, 5 Drawing Sheets

CANTILEVER FASTENER ASSEMBLY

REFERENCE TO RELATED APPLICATIONS

This application is a Continuation-In-Part of U.S. patent application Ser. No. 08/492,211 entitled CANTILEVER FASTENER ASSEMBLY and filed on Jun. 19, 1995, abandoned, and a Continuation-In-Part of U.S. patent application Ser. No. 08/566,854 filed Dec. 4, 1995 Abandoned and entitled CANTILEVER FASTENER ASSEMBLY.

BACKGROUND OF THE INVENTION

1. Field of the Invention blind fastener that can be readily adapted to interconnect a wide variety of objects and structural elements.

2. Description of the Background Art

Over the years, a vast array of fasteners have been proposed, with each being cited as having one or more advantages that make it suitable for a given application or installation. In situations where the user lacks convenient access to one side of the structural components to be joined, however, the options are somewhat limited. Fasteners installed in structural members such as hollow walls, for example, typically comprise a threaded member, such as a bolt or screw, and an anchoring mechanism. Rotation of the threaded member causes the anchoring mechanism to expand and contact the inside of the wall to anchor the fastener in place. Common examples of such fasteners are the so-called "toggle" bolts and "moly" bolts.

One problem associated with blind fasteners of the aforementioned type is that a portion of the anchoring mechanism is usually received within the hole in the wall through which the fastener is inserted. Therefore, stress exerted by heavy objects attached to the fastener on the outside of the wall may cause the fastener to pull outwardly through the opening. Another problem is that the fasteners must be carefully installed to ensure that they are not over-torqued. Continued twisting of the threaded bolt or screw after the anchoring mechanism has contacted the inner surface of the wall will cause the anchoring mechanism to twist and dig into the inner surface of the wall. This digging action gouges the periphery of the wall hole, which causes the fastener to fit loosely within the wall and thereby increases the likelihood that the fastener will become dislodged from the wall.

Additionally, the supporting capacity/strength of conventional fastening structures is limited by a relatively short axis of rotation in the axial plane. As will be readily appreciated by those skilled in the art, this axis is defined by the distance between the points of support provided by the anchoring assembly and threaded member. In the case of prior art configurations such, for example, as the "moly" bolt, this distance is equivalent to the thickness of the wall or wallboard and is typically far too short to support large or heavy objects due to the high concentration of stresses over such a small area. Blind fasteners of this type will generally support a vertical weight of about 30 lbs in ½ inch thick drywall, at a distance of 0 to ½ in from the wall surface.

Another type of blind fastener, the rivet, is most often used where two or more overlapping planar elements are to be joined. For example, in the construction of modem aircraft, rivets are typically used to join the individual sheets of aluminum that collectively form a skin over the air frame. In such an environment, it is usually permissible for the adjacent rivets to be separated by the preferred spacing of one rivet diameter. Rivets have also be employed in the construction of more advanced aircraft that require the joining of complex control surfaces of graphite or other composite materials. Due to stress concentrations adjacent the holes in such materials, however, the inter-rivet spacing must be increased to four rivet diameters—thereby limiting the joining forces that may be applied. Extremely close tolerances must also be observed in order to ensure a reliable attachment.

SUMMARY OF THE INVENTION

The deficiencies associated with the prior art are avoided by a fastener assembly in which joining forces are imparted at three or more radially distributed regions that are located away from the peripheral edges of aligned openings in respective elements to be fastened. In this manner, stress concentrations at the periphery of the aligned openings are substantially avoided. It is contemplated that fasteners constructed in accordance with the teachings of the present invention may be employed in connection with the support of relatively heavy objects on such diverse structural assemblies as hollow and solid core walls, metal frame members, channels and panel members, concrete and cinder block structures, as well as other structures which will become apparent to the artisan of ordinary skill. It is further contemplated that fasteners constructed in accordance with the present invention may be utilized as an alternative to the rivet as a means to secure overlapping sheets or panels of material.

A fastener constructed in accordance with an illustrative embodiment of the present invention includes a face plate having a central aperture alignable with an opening defined by respective elements to be joined, an anchoring assembly dimensioned for insertion into and through the opening and comprising a base portion and a support structure extending therefrom, and a positioner for axially moving the support structure of the anchoring assembly relative to the face plate.

The face plate has a front surface and a rear surface, the rear surface being positionable on a surface of either (1) a first structural element—wherein a second structural element may be attached to the face plate via one or more conventional fastening techniques such, for example, as the use of threaded screws, stud welded members, and the like or (2) a second structural element—wherein the first and second structural element have aligned through openings and are held together in a laminar or overlapping relationship between the apertured face plate and the anchoring assembly.

The support structure is manipulable between a folded position facilitating insertion through the opening in the apertured structural element(s) and a diverging or spread position. Once the anchoring assembly has been inserted through an aperture in the structural member(s), the support structure projects from the base portion in an axial direction toward the interior surface of the first structural element, thereby preventing its removal.

The positioner is dimensioned and arranged to extend, upon insertion of the anchoring assembly through the opening in the first structural element, from the base portion in a direction axially aligned with the face plate aperture. A pulling force may thereby be exerted on the anchoring assembly via the positioner such that the anchoring assembly is moved into a final position in which the support structure engages surface regions of the first structural element opposed to the surface upon which the face plate is positioned.

The support structure of the anchoring assembly is dimensioned and arranged to impart, when in the diverging position and upon complete actuation of the positioner, joining forces on an interior surface of the first structural element at three or more radially equidistant regions isolated from the peripheral edge of the opening without imparting forces on the interior surface of the second structural element at any point between an edge of the opening and the radially equidistant regions. The support structure of the anchoring assembly is sufficiently rigid as to resist continued movement of the base portion toward the face plate when distal regions of the support structure initially contact the first structural element—despite continued exertion of pulling forced on the anchoring assembly by the positioner. Joining forces are exerted by these same distal regions, and the support structure is sufficiently rigid as to prevent displacement of the distal regions from their initial positions of contact with the first structural element despite continued exertion of pulling forces on the anchoring assembly by the positioner.

The various features of novelty which characterize the invention are pointed out with particularity in the claims annexed to and forming part of the disclosure. For a better understanding of the invention, its operating advantages, and specific objects obtained by its use, reference should be had to the accompanying drawings and descriptive matter in which there are illustrated and described several embodiments of the invention.

BRIEF DESCRIPTION OF THE DRAWINGS

The various objects and advantages of the invention will be apparent from the detailed description and claims when read in conjunction with the accompanying drawings wherein:

DETAILED DESCRIPTION OF THE INVENTION

In the description which follows, like parts are marked throughout the specification and drawings, respectively. The drawings are not necessarily to scale and in some instances proportions have been exaggerated in order to more clearly depict certain features of the invention.

Figures 1, 2:
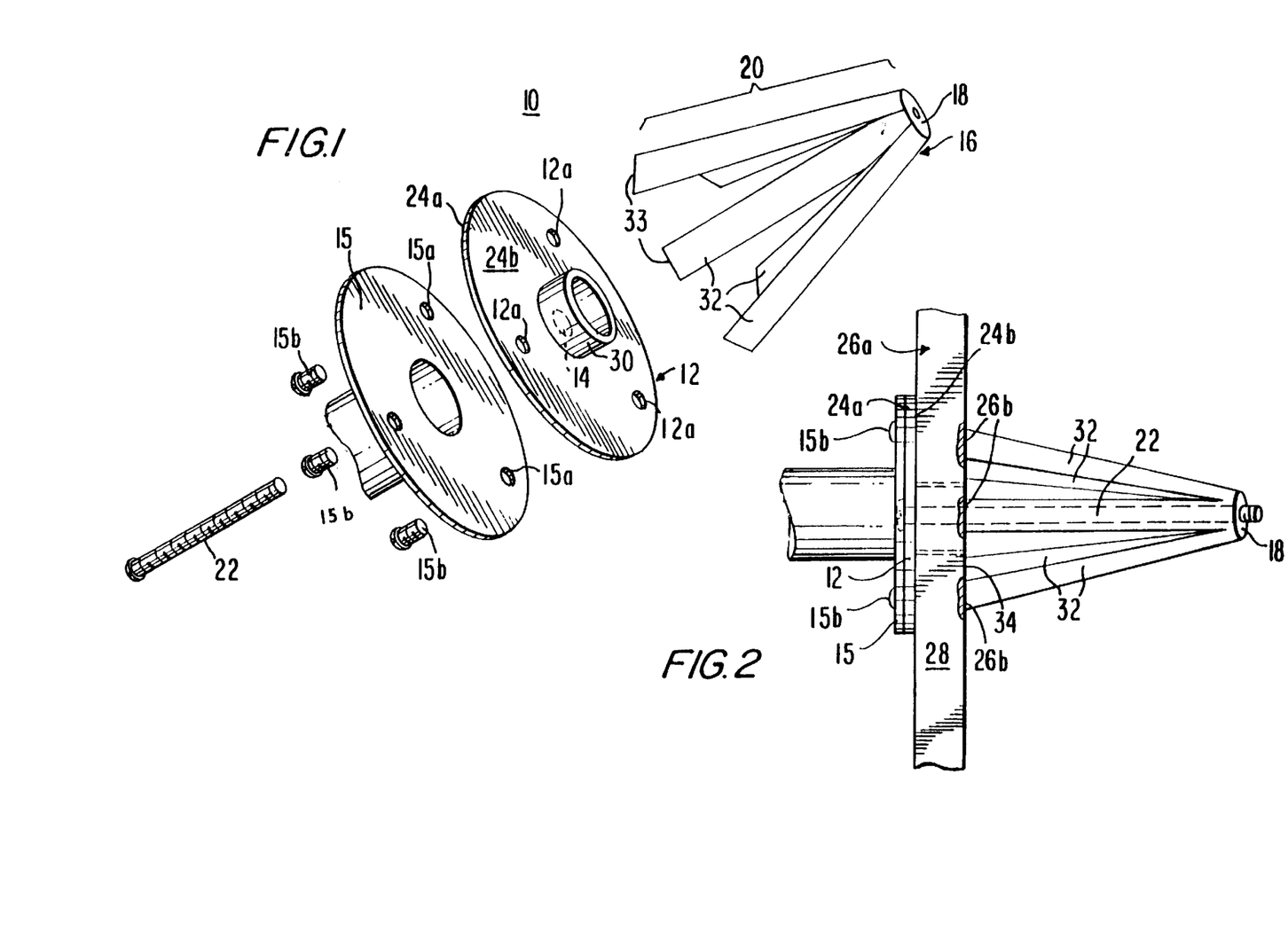
FIG. 1 is an exploded perspective view of a fastener assembly constructed in accordance with an illustrative embodiment of the present invention.
FIG. 2 is a side elevation view depicting the fastener of FIG. 1 during installation, showing initial contact of the support structure distal regions with the interior surface of a drywall panel.

With initial reference to FIGS. 1–4, there is shown a fastener assembly constructed in accordance with an illustrative embodiment of the present invention. As best seen in FIG. 1, fastener assembly 10 includes a thin face plate 12 having a central aperture 14, an anchoring assembly 16 dimensioned for insertion into and through an opening and comprising a base portion 18 and a support structure 20 extending therefrom, and a positioner 22 for axially moving the support structure 20 of the anchoring assembly 16 relative to the face plate 12.

Face plate 12 has a front surface 24a and a rear surface 24b, the rear surface being positionable on a surface of either (1) a first structural element—wherein a second structural element may be attached to the face plate via one or more conventional fastening techniques such, for example, as the use of threaded screws, stud welded members, and the like or (2) a second structural element—wherein the first and second structural element have aligned through openings and are held together in a laminar or overlapping relationship between the apertured face plate and the anchoring assembly. In the illustrative installation depicted in FIGS. 2–3, the fastener assembly 10 is shown as being employed in the former application, with rear surface 24b overlying exterior surface 26a of a single panel member 28 and with central aperture 14 being aligned with a hole 29 previously formed, as by drilling or other operation, to accommodate insertion of anchoring assembly 16. As best seen in FIG. 1, a tubular spacer element 30 extending from rear surface 24b of face plate 12 may be employed to prevent shifting of the faceplate relative to the hole and to thereby ensure precise alignment of the anchoring assembly 16 during installation. For this purpose, the cross sectional profile of spacer element 30 should be selected so that it closely corresponds to that of preformed hole 29.

Figure 3:
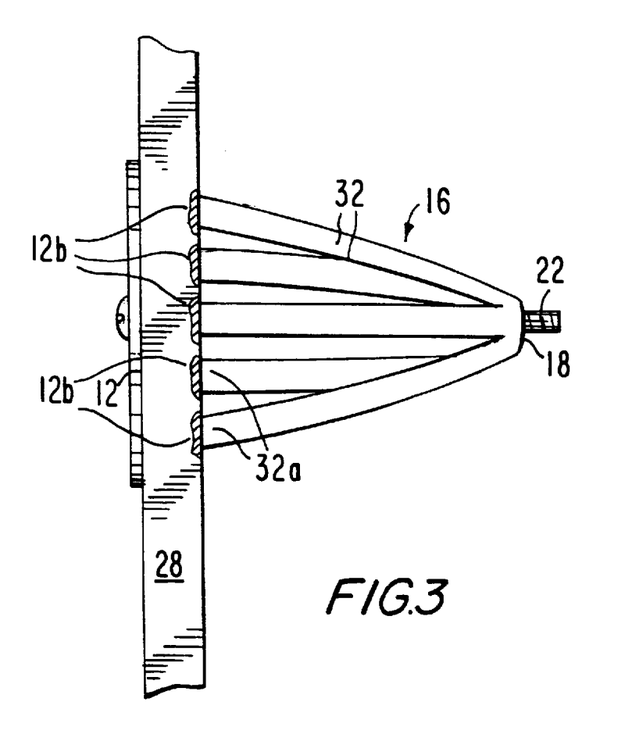
FIG. 3 is a side elevation view depicting the fastener of FIG. 1 in the final installed position.
Figure 4:
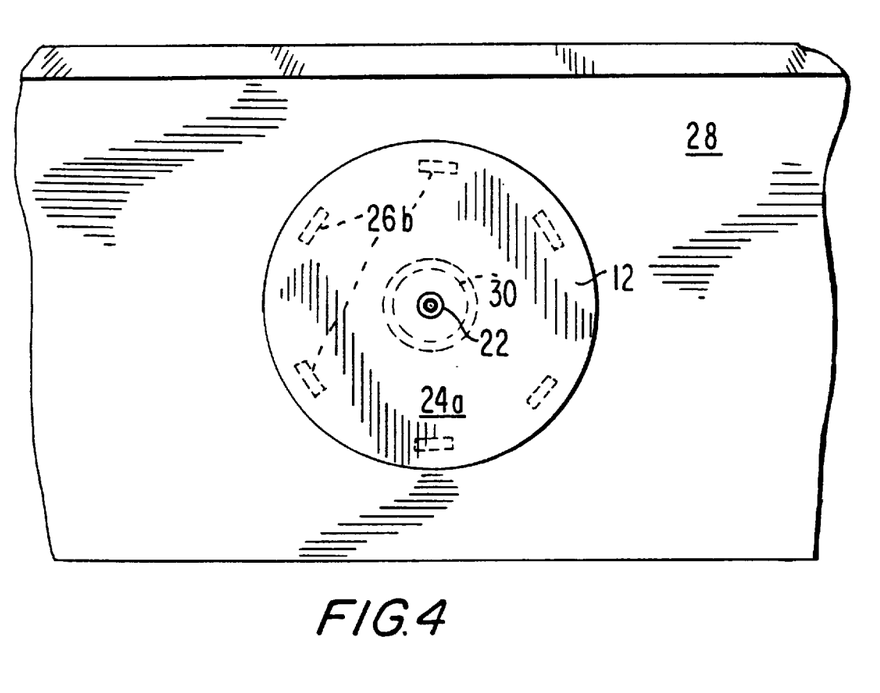
FIG. 4 is a front elevation view showing the external appearance of the fastener of FIGS. 1–3 as installed, with the radially distributed regions of contact with the interior surface of the drywall panel shown in dotted line form.

The face plate 12 is maintained in the position shown in FIGS. 2–4 by anchoring assembly 16. Support structure 20 of anchoring assembly 16 is manipulable between a folded position facilitating insertion through an opening in the apertured structural element(s), as hole 29 in single panel member 28, and a diverging or spread position (FIGS. 2 and 3). Thus, and as best seen in FIGS. 2 and 3, once the anchoring assembly 16 has been inserted through an aperture in one or more structural member(s), the support structure 20 projects from the base portion 18 in an axial direction toward the interior surface of a first structural element as, for example, toward interior surface 26b of single panel 28, to thereby prevent its removal.

Although a wide variety of anchoring assembly configurations may be employed in the practice of the present invention, only a few representative examples of these will be discussed in detail herein. In the illustrative embodiment of FIGS. 1–4, the support structure 20 of anchoring assembly 16 comprises three or more elongated wing members 32 that extend from base portion 18 in a direction toward the rear or interior surface of face plate 12. To permit insertion of the anchoring assembly 16 into the one or more of the structural elements to be joined, the wing members 32 are bendable inwardly. In accordance with this embodiment, the wing members 32 are outwardly biased so that they expand outwardly from the folded position once the respective distal tips thereof clear the interior surface of the first structural element as surfaces 26b of single panel 28. In that regard, the anchoring assembly 16 may be manipulated prior to insertion such that the wing member tips 33 are confined within spacer element 30, with an axial force being applied to the positioner 22 to force the wing tips 33 out of engagement with the spacer and into the diverging position shown in FIGS. 2 and 3.

It should be noted that alternatives to outward biasing of the wing members 32 are also feasible. By way of illustrative example, they may assume a folded position while at rest and be spread mechanically by camming action against suitably dimensioned structure (not shown) extending from the rear surface of the face plate as sufficient distance into the opening.

Fastener 10 further includes a positioning element 22 that is dimensioned and arranged to extend, upon insertion of the anchoring assembly 16 through an opening into a first structural element, from the base portion 18 in a direction axially aligned with the face plate aperture. A pulling force may thereby be exerted on the anchoring assembly 16 via the positioning element 22 such that the anchoring assembly 16 is moved into the intermediate and final positions of FIGS. 2–3, respectively. In the illustrative embodiment of FIGS. 1–4, positioning element 22 comprises a threaded member and the base portion 18 of anchoring assembly 16 defines a central aperture correspondingly threaded to receive the threaded positioning element 22.

As will be readily appreciated by those skilled in the art, as threaded positioning element 22 is rotated, the anchoring assembly 16 is drawn closer to face plate 12 until respective distal tip regions 32a of anchoring assembly 16 contact corresponding interior surface regions 26b of the first structural element 28. Spinning of the anchoring assembly 16 during installation may, for example, be prevented by applying a pulling force to the positioning element 22 as it is rotated. In the specific embodiment depicted in FIGS. 2–4, a thin wire or other structure (not shown) might instead be looped over one of the wings 32 and secured at each end to the face plate 12 or spacer 30 to prevent rotation of the anchoring assembly 16.

Advantageously, the regions of contact between the distal tip regions 32a of the support structure 20 are radially equidistant, that is, symmetrically arranged relative to the center of the opening, so that joining forces are exerted at evenly distributed locations remote from the edge of the opening. The support structure 20 of the anchoring assembly 16 is thus dimensioned and arranged to impart, when in the diverging position and upon complete actuation of the positioning element 22 (FIG. 3), joining forces on the interior surface of the first structural element 28 at three or more radially equidistant regions 26b isolated from the peripheral edge of the opening 29, without imparting forces on the interior surface of the first element at any point between an edge of the opening and the radially equidistant regions. In this manner, stress concentrations at the edges of the aligned openings are avoided and more relaxed tolerances are made possible.

According to the present invention, the support structure 20 of the anchoring assembly 16 is sufficiently rigid as to resist continued movement of the base portion 18 toward the face plate 12 when distal regions, as regions 32a of the support structure 20, initially contact the first structural element, despite continued actuation of the positioning element 22. Joining forces are exerted by these same distal regions of the support structure, with the support structure also being sufficiently rigid as to prevent displacement of the distal regions from their initial positions of contact with the first structural element (FIG. 2) despite continued actuation of the positioning element 22. Thus, although continued actuation of the positioning element may produce a small amount of bending in wing members 32 after the position in FIG. 2 is reached (as suggested in the final position depicted in FIG. 3), the tip portions 32a do not move from their initial points of contact 26b. It will therefore be readily appreciated by those skilled in the art that the flattening of the anchoring member that is characteristic of conventional fasteners, and which disadvantageously results in a concentration of forces in the area immediately adjacent to the hole, does not occur in the anchoring assembly of the present invention.

In the absence of a strong second structural member interposed between face plate 12 and wings 32 of anchoring assembly 16, the outside diameter (or minimum dimension) of face plate 12 is preferably (although not necessarily) selected so that the biased wing members 32 of anchoring assembly 16 do not extend beyond the peripheral edge(s) thereof. This arrangement distributes stresses only over those portions of the surrounding wall which are in compression—providing substantially enhanced mechanical strength and stability. Where the fastener of the present invention is employed to secure a large, rigid, second structural member to the first structural member, the wings may extend beyond face plate 12. Indeed, the structurally rigid second member may itself be considered an extension of the face plate in that the two components together may serve to distribute forces over a much greater area than face plate 12 alone. Thus, for example, the fastener of the present invention may be employed to secure a kitchen cabinet or similar structure to a gypsum wall board structure.

It will be readily appreciated by those skilled in the art that the fastener assembly of the present invention may be fabricated from any material having sufficient shear strength to withstand reasonable weights and loads secured to face plate 12 or held between the face plate and a structural member as panel member 28. Utilizing two fasteners of the configuration depicted in FIGS. 1–4 with a stainless steel face plate of 2.875 inches in diameter and 0.1875 inches in thickness and a stamped anchoring assembly of half-hardened stainless steel 0.030 inches thick, applicants have supported a grab bar with over 300 pounds suspended therefrom at a distance of 3 inches from a tiled wall. It is contemplated that a variety of other materials such, for example, as polyethylene, glass reinforced nylon, graphite composites may also be employed, depending upon the specific application.

Figure 5:
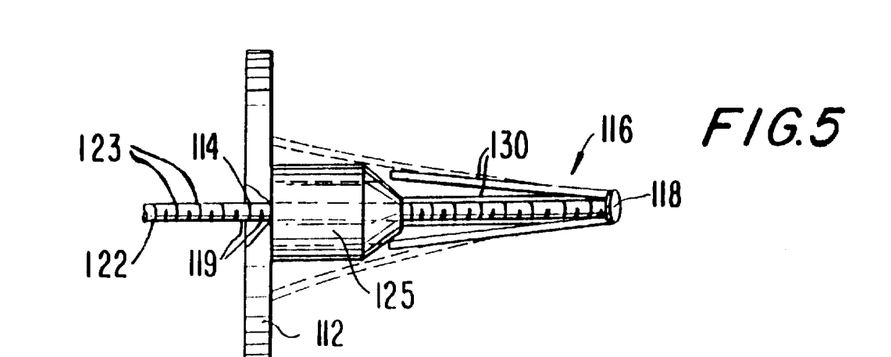
FIG. 5 is an exploded perspective view of an alternate embodiment of the present invention, with the construction of the face plate being shown in partial cross section.

With reference now to FIGS. 5–12, it will be seen that various modifications and alternate configurations of the fastener assembly of the present invention are possible. In the embodiment of FIG. 5, for example, the positioning element 122 extends from the center of the base portion 118 of anchoring assembly 116 and is attached, coupled or integrally formed therewith. The positioning element 122 is configured in the manner of a wire tie and comprises a an elongated member with a series of spaced cerrations 123. Faceplate 112 is similar in construction to face plate 12 of FIGS. 1–4, but is modified to include a series of cerrations 119 within central aperture 114. The anchoring assembly 116 is inserted into the wall and positioning element is merely pulled through the central aperture 114 of faceplate 112, spreading the wing members 130 until the final position (shown in partial dotted line form in FIG. 5) is reached.

Figure 6A:
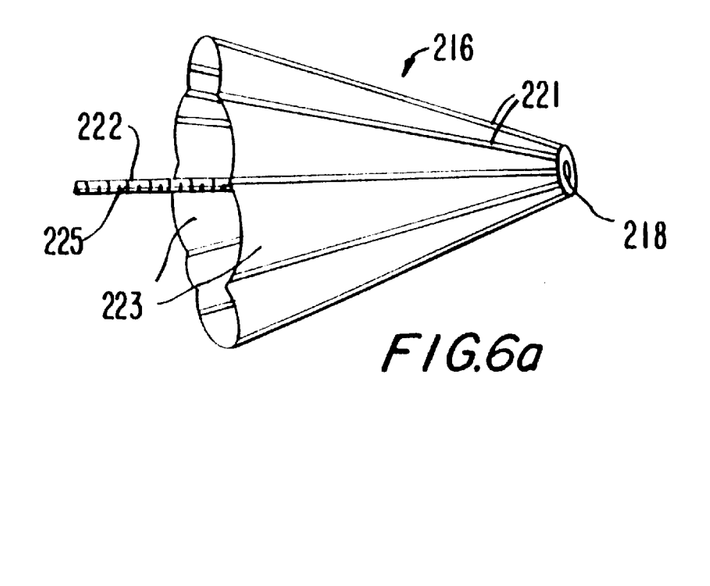
FIG. 6a is a perspective view of a modified anchoring assembly constructed in accordance with the present invention.
Figure 6B:
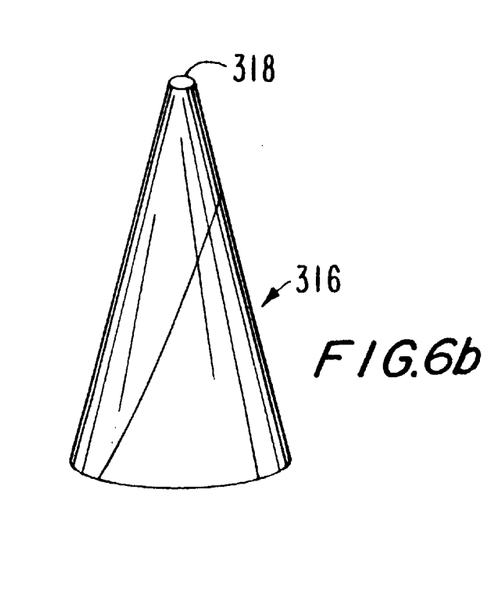
FIG. 6b is a perspective view of another modified anchoring assembly constructed in accordance with the present invention.

FIGS. 6a and 6b depict modified configurations of the anchoring assembly. Referring first to FIG. 6a, there is shown an anchoring assembly 216 which resembles a badminton "birdie", consisting of a conical framework of diverging members 221 interconnected by lateral stiffeners 223. The embodiment of FIG. 6a is contemplated as being feasible for implementation using a resilient material such, for example, as glass reinforced nylon or the like. As in the preceding example depicted in FIG. 5, positioning element 222 is configured as an elongated element with serrated teeth 225 engageable with mating structure on an apertured faceplate (not shown). In the embodiment of FIG. 6b, the anchoring assembly 316 is constructed as a deformable cone, with the base portion 318 comprising, for example, a threaded apex region. To facilitate insertion through an opening, the anchoring assembly may be configured as a single sheet of a spirally wound resilient material, as, for example, spring steel, with insertion being achieved by rotation of the positioning element (not shown) in a first direction to provide a tightly wound cone (not shown) and, following insertion, rotation in the opposite direction to unwind the cone and produce the arrangement shown in FIG. 6b.

Figure 7:
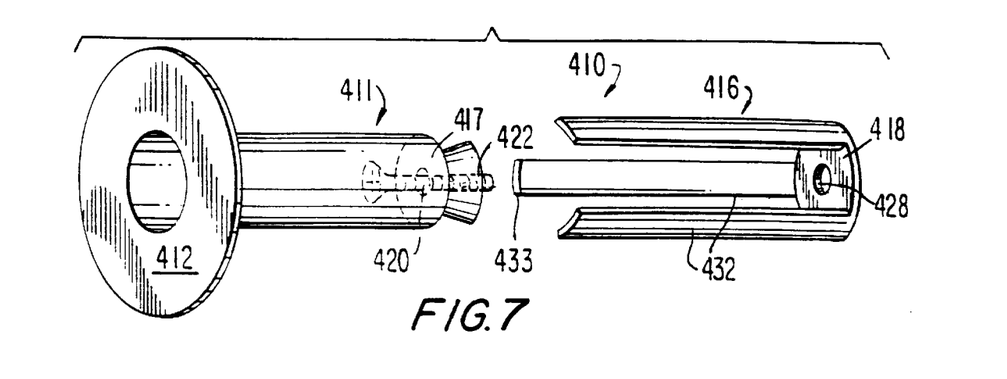
FIG. 7 is an exploded perspective view of a further embodiment of the present invention employing an apertured tubular body extending from the face plate.
Figure 8:
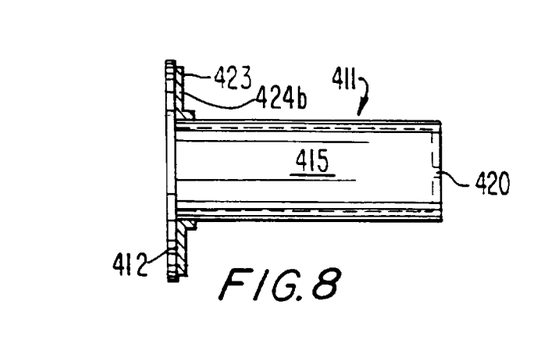
FIG. 8 is a cross sectional view depicting the interior construction of the tubular body structure of FIG. 7.
Figure 9:
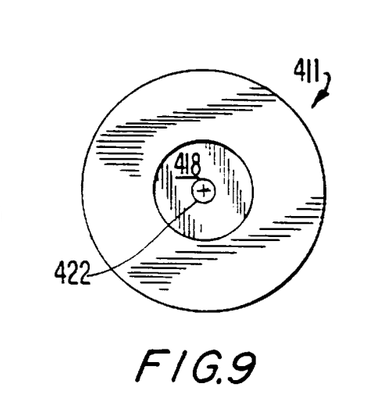
FIG. 9 is a front elevation view showing the external appearance of the tubular body member of FIG. 7 as installed.

With reference now to FIGS. 7–9, an embodiment of the present invention employing an apertured tubular body extending from the face plate will now be described in detail. As best seen in FIG. 7, fastener 410 includes an elongated tubular body 411 attached at its proximal end to face plate 412. The tubular body 411 defines an axial cavity 415 (FIG. 8) which may be dimensioned to receive a correspondingly dimensioned support member (not shown). Of course, if it is not desired to retain or support such a support member, a flush fitting cap or other closure member (not shown) dimensioned and textured to blend with face plate 412 may be employed. Although the tubular body 411 and face plate 412 are shown as having a circular cross sectional profile, it should be noted that such a configuration is for illustrative purposes only. It is, in fact, contemplated that a variety of cross sectional profiles may be utilized, depending upon aesthetic considerations and the individual tastes of the user. Thus, for example, the face plate and/or tubular body may have an oval or semicircular (arched) profile, or a polygonal (e.g., triangular, rectangular, trapezoidal, hexagonal, octagonal, etc.) cross sectional profile.

In any event, and with particular reference to FIGS. 8 and 9, it will be seen that tubular body 411 further includes a distal end wall 417 having a centrally located aperture 420 dimensioned to receive positioning element 422, illustratively, a threaded member insertable into a correspondingly threaded opening 428 in the base portion 418 of anchoring assembly 416. As will be readily appreciated by those skilled in the art, as threaded member 422 is rotated, the anchoring assembly 416 is drawn closer to face plate 412 until the edge surfaces 433 of anchoring assembly wings 432 contact the inside surface of the first structural element. If desired, an adhesive layer 423 (FIG. 8) may be applied or otherwise provided on the rear surface 424b of face plate 412 to restrict movement of the tubular body during installation and to enhance the reliability of the structure thereafter.

Figure 10:
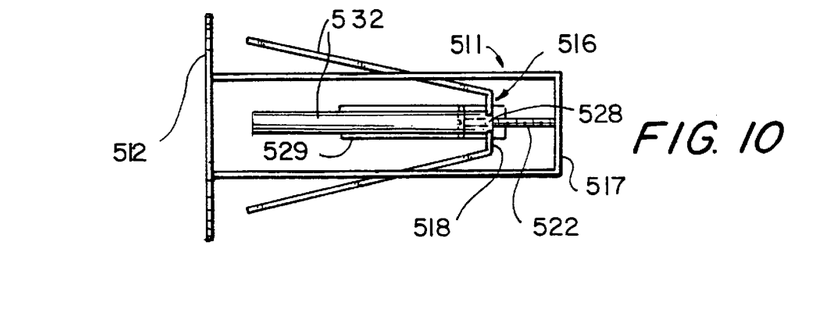
FIG. 10 is a perspective view of a fastener assembly constructed with another modified embodiment of the present invention.

In the embodiment of FIG. 10, the anchoring assembly 516 is dimensioned for axial movement within tubular body 511. The anchor member 516 is maintained in a desired position relative to the tubular body 511 by a threaded member 522 that extends through a threaded aperture 528 in the base portion 518 of anchoring assembly 516 and abuts against tubular body end wall 517. Axial movement of the anchoring assembly is accommodated by a pattern of slots 529 radially arranged along the tubular body 511 and dimensioned to permit complete extension of wings 532 regardless of the axial position relative to the face plate 512.

Figure 11:
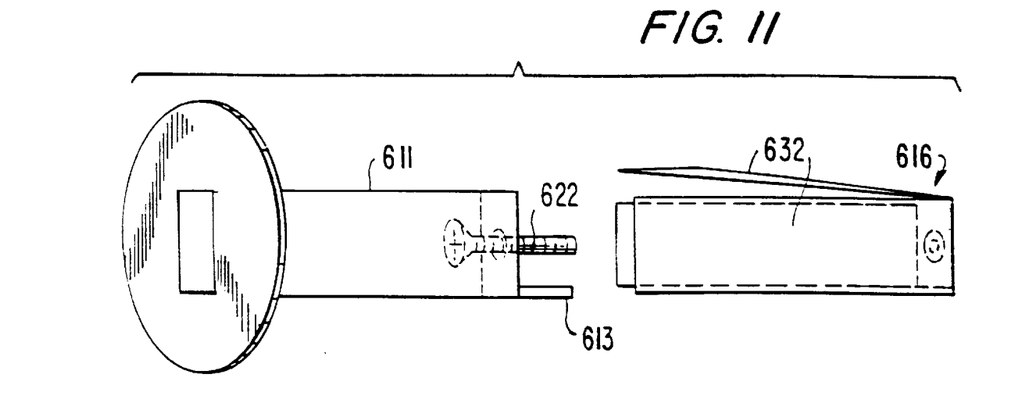
FIG. 11 is an exploded perspective view of a fastener assembly constructed in accordance with yet another embodiment of the present invention.
Figure 12:
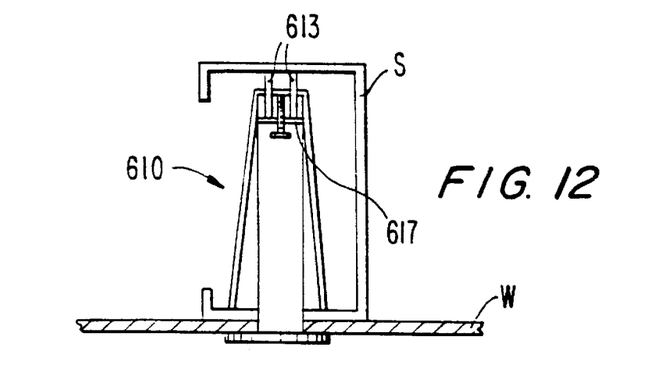
FIG. 12 is a plan view of the fastener assembly of FIG. 11 installed with a metal stud of the type commonly found in the construction of commercial office buildings and other structures.

With reference to FIGS. 11 and 12, there is shown an embodiment of the fastener of the present invention modified for use in conjunction with rigid structural members such, for example, as steel studs or exterior sheathing panels. As seen in FIG. 11, tubular body 611 is modified such that one or more elongated projections 613 extend from the lower exterior portion of rear end wall 617. By way of illustrative example, these projections may be configured as pins, with either flat or rounded tips, or as teeth configured to bite into the surface of a stud or panel. For a purpose which will soon be explained, the anchoring assembly 616 is also modified in that the wings 632 are distributed to define a gap region to accommodate projections 613. Turning to FIG. 12, it will be seen that when the fastener 610 is inserted through an opening in one flange portion of stud S, projections 613 engage into the other flange portion. This arrangement advantageously exploits the structural strength of the stud while also providing additional cantilever support utilizing the wing structure of the present invention.

In accordance with a further embodiment of the present invention for use in conjunction with rigid structural members, not shown, the anchoring member is omitted altogether. The tubular body is modified such that one or more elongated projections extend from both the upper and lower exterior surface portions of the tubular body rear end wall. Here again, these projections may be configured as pins, with either flat or rounded tips, or as teeth configured to bite into the surface of a stud or panel. To ensure stability in the case of horizontally directed loads, such as those caused by a strong wind upon the surface of a sign, additional elongated projections are preferably included at intermediate exterior portions of the tubular body end wall.

Fastener assemblies constructed in accordance with the present invention can carry a wide variety of attachments and assume a myriad of configurations. For instance, the fastener could be employed as an integral wall anchor to secure a cabinet to a hollow wall or function as a separate fastener in place of screws, nails, or rivets. Similarly, the tubular body employed in the embodiments of FIGS. 7–9, 10, and 11–12 could carry shelving brackets or define attachment means suitable for detachable brackets as commonly used in shelving systems. In this regard, the elongated stem of an object to be supported, or of an underlying support member, may be merely inserted into the axial cavity of the tubular body. To further enhance the reliability of the support arrangement, means may be included to selectively lock the inserted stem within the cavity of the tubular body. In the case of a tubular body having a circular cross sectional profile, for example, the exterior surface of the stem and the interior surface of the tubular body may be threaded for mating engagement—with the object supporting stem being inserted by rotating the same until it is fully inserted into the tubular body. By way of further example, a flange or mounting collar secured to the object supporting stem may be provided with appropriate apertures and attached to the face plate by threaded screws, an adhesive compound, or other suitable means.

By way of yet another example, the object stem and axial cavity may be configured with inter-engaging cerrations to impede axial movement of the installed object step or, alternatively, with a conventional twist-and-lock arrangement using, for example, an interference fit (friction-lock). Thus, in an axial cavity having an ellipsoidal cross-sectional profile, the object supporting stem may be configured with an ellipsoidal cross sectional profile extending at least a portion of its length and having a major axis which is slightly larger than the minor axis of the axial cavity but sufficiently smaller than the major axis of the axial cavity to permit the stem to be inserted when the axes of each are aligned. As will be readily appreciated by those skilled in the art, once the object supporting stem has been successfully introduced into the axial cavity, the formed may be rotated until a friction lock is achieved.

In addition the illustrative embodiments and applications discussed in detail above, it will be readily appreciated by those skilled in the art that there are many other types of structural assemblies with which the inventive fastener may be used. By way of additional example, aluminum frame members are commonly employed in the construction of store front window arrangements to provide the merchant with the largest possible display area for his or her wares. Heretofore, however, the merchant wishing to display relatively heavy goods and other articles in the store window has been required to use large and expensive floor supported displays since there has been no fastener available to take advantage of the supporting properties of the window frame members. It should also be noted that door mounting hardware such, for example, as hinges and self-closing mechanism is typically secured to frame members of the aforementioned type. Repeated use of this hardware inevitably leads to failure due to the concentration of stressed about a relatively small area of attachment.

In view of the foregoing, it is obvious that many changes in and additions to the above described illustrative embodiments may be made without departing from the nature, spirit, and scope of the invention, and that the invention is not limited to said details except as set forth in the appended claims.

What is claimed is:

1. A fastener assembly for use in joining first and second structural elements to be joined, comprising:

a face plate having a front surface and a rear surface and defining an aperture alignable with an opening in the first structural element; and an anchoring assembly insertable through the opening defined in the first structural element, said anchoring assembly having a base portion, a projecting portion extending in an axial direction from said base portion, said projecting portion comprising at least three elongated, outwardly biased wing members being manipulable between a folded position facilitating insertion through the opening in the first structural element and a diverging position preventing withdrawal of the anchoring member through the opening, and a positioning element for moving the base portion and projecting portion in an axial direction toward the face plate, said positioning element extending from said base portion and being axially aligned with the face plate aperture, wherein said projecting portion is dimensioned and arranged to impart, when in said diverging position and upon actuation of said positioning element, joining forces on an interior surface of the first structural element at three or more radially equidistant regions isolated from the periphery of the opening without imparting forces on the interior surface of the first structural element at any point between an edge of the opening and said radially equidistant regions, wherein the projecting portion of the anchoring assembly is sufficiently rigid as to restrict further movement of the base portion toward the face plate when the projecting portion initially contacts the first structural element, despite continued actuation of the positioning element, and wherein the projecting portion is sufficiently rigid as to prevent displacement of distal regions of the anchoring assembly from initial positions of contact with the first structural element despite progressive exertion of a pulling force on the anchoring assembly by the positioning element.

2. The fastener assembly of claim 1, further including a spacer element secured to said faceplate and insertable into the opening to thereby restrict movement of said face plate relative to the opening.

3. The fastener assembly of claim 2, wherein the projecting portion of said anchoring assembly is outwardly biased into said diverging position and wherein said spacer element is further dimensioned and arranged to retain said projecting portion in the folded position during insertion of the anchoring assembly through the opening.

4. The fastener assembly of claim 1, wherein each of the wing members extends from said base portion and has a tip portion defining said radially equidistant regions of contact with the first structural member.

5. The fastener assembly of claim 1, wherein elongated members are interconnected by lateral stiffeners, each elongated member extending from said base portion and having a tip portion defining said radially equidistant regions of contact with the first structural member.

6. The fastener assembly of claim 1, wherein said positioning element is dimensioned and arranged to extend from said base portion and through said opening and said apertured face plate.

7. The fastener assembly of claim 6, wherein said base portion defines a threaded, central aperture and wherein said positioning element comprises a threaded member, whereby axial movement of the anchoring assembly relative to the face plate is achieved by rotation of the threaded member.

8. The fastener assembly of claim 6, wherein said positioning element comprises an elongated member defining a plurality of teeth, said fastener assembly further including a retaining structure, aligned with said face plate aperture, defining complementary teeth engageable with said elongated member so as to permit movement of the anchoring assembly toward the face plate while preventing movement in the opposite direction.

9. The fastener assembly of claim 6, wherein said positioning element comprises an elongated member defining a plurality of teeth and wherein said face plate defines complementary teeth, aligned with said face plate aperture, engageable with said elongated member so as to permit movement of the anchoring assembly toward the face plate while preventing movement in the opposite direction.

10. The fastener assembly of claim 1, further including a tubular body secured to said face plate, said tubular body being dimensioned for insertion into the opening in said first structural element and having an end wall defining an aperture dimensioned to accommodate insertion of said positioning element.

11. The fastener assembly of claim 1, further including a tubular body secured to said face plate, said tubular body having at least one sidewall defining a plurality of slots equal in number to the number of radially equidistant regions of contact defined by the projecting portion.

12. The fastener assembly of claim 1, further comprising camming means engageable with said projecting portion for causing said projecting portion to spread into said diverging position upon actuation of said positioning element.

13. The fastener assembly of claim 1, wherein said faceplate defines at least one threaded opening dimensioned and arranged to receive a correspondingly threaded fastener passing through an opening in the second structural element.

14. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion being manipulable between a folded position facilitating insertion through the opening in the first structural element and a diverging position preventing withdrawal of the anchoring member through the opening and comprising at least three elongated, outwardly biased wing members, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force.

15. The anchoring assembly of claim 14, wherein the projecting portion is outwardly biased into said diverging position.

16. The anchoring assembly of claim 14, wherein said elongated, outwardly biased wing members, each extending from said base portion have a tip portion defining a respective radially equidistant region of contact with the first structural member.

17. The anchoring assembly of claim 14, further including a positioning element for exerting said pulling force, said positioning element being dimensioned and arranged to extend from said base portion and through said opening.

18. The anchoring assembly of claim 17, wherein said base portion defines a threaded, central aperture and wherein said positioning element comprises a threaded member, whereby axial movement of the anchoring assembly relative to the first structural element is achieved by rotation of the threaded member.

19. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, projecting portion, extending in an axial direction from said base portion, for imparting joining forces on an interior surface of the first structural element at three or more radially equidistant regions isolated from the periphery of the opening without imparting forces on the interior surface of the first structural element at any point between an edge of the opening and said radially equidistant regions, said protecting portion comprising at least three elongated, outwardly biased wing members manipulable between a folded position facilitating insertion through the opening in the first structural element and a diverging position preventing withdrawal of the anchoring member through the opening, said joining forces being imparted when said wing members are in said diverging position and upon exertion of the pulling force, wherein the protecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, wherein said elongated outwardly biased wing members are interconnected by lateral stiffeners, each elongated member extending from said base portion and having a tip portion defining a respective radially equidistant region of contact with the first structural member.

20. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, projecting portion, extending in an axial direction from said base portion, for imparting joining forces on an interior surface of the first structural element at three or more radially equidistant regions isolated from the periphery of the opening without imparting forces on the interior surface of the first structural element at any point between an edge of the opening and said radially equidistant regions, said projecting portion comprising at least three elongated, outwardly biased wing members manipulable between a folded position facilitating insertion through the opening in the first structural element and a diverging position preventing withdrawal of the anchoring member through the opening, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the protecting portion of the anchoring assembly is sufficiently rigid as to prevent displacement of distal regions of the anchoring assembly from their initial positions of contact with the first structural element despite progressively increased exertion of the pulling force, said anchoring assembly of further comprising a positioning element for exerting said pulling force, said positioning element being dimensioned and arranged to extend from said base portion and through said opening, wherein said positioning element comprises an elongated member defining a plurality of teeth, said anchoring assembly further including a retaining structure, alignable with the opening in the first structural element, defining complementary teeth engageable with said elongated member and dimensioned so as to permit movement of the anchoring assembly toward the face plate while preventing movement in the opposite direction.

21. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion comprising at least three elongated, outwardly biased wing members manipulable between a folded position facilitating insertion through the opening in the first structural element and a diverging position preventing withdrawal of the anchoring member through the opening, said wing members comprising tip portions that impart joining forces on an interior surface of the first structural element at three or more radially equidistant regions isolated from the periphery of the opening without imparting forces on the interior surface of the first structural element at any point between an edge of the opening and said radially equidistant regions, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, wherein said elongated outwardly biased wing members are interconnected by lateral stiffeners, each elongated member extending from said base portion and having a tip portion defining a respective radially equidistant region of contact with the first structural member.

22. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion comprising at least three elongated, outwardly biased wing members manipulable between a folded position facilitating insertion through the opening in the first structural element and a diverging position preventing withdrawal of the anchoring member through the opening, said wing members comprising tip portions that impart joining forces on an interior surface of the first structural element at three or more radially equidistant regions isolated from the periphery of the opening without imparting forces on the interior surface of the first structural element at any point between an edge of the opening and said radially equidistant regions, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, said anchoring assembly of further comprising a positioning element for exerting said pulling force, said positioning element being dimensioned and arranged to extend from said base portion and through said opening, wherein said positioning element comprises an elongated member defining a plurality of teeth, said anchoring assembly further including a retaining structure, alignable with the opening in the first structural element, defining complementary teeth engageable with said elongated member and dimensioned so as to permit movement of the anchoring assembly toward the face plate while preventing movement in the opposite direction.

23. A fastener assembly for use in joining first and second structural elements to be joined, comprising:

a face plate having a front surface and a rear surface and defining an aperture alignable with an opening in the first structural element; and an anchoring assembly insertable through the opening defined in the first structural element, said anchoring assembly having a base portion, a projecting portion extending in an axial direction from said base portion, said projecting portion comprising at least three elongated, outwardly moveable wing members being manipulable between a folded position facilitating insertion through the opening in the first structural element and a diverging position preventing withdrawal of the anchoring member through the opening, and a positioning element for moving the base portion and projecting portion in an axial direction toward the face plate, said positioning element extending from said base portion and being axially aligned with the face plate aperture, wherein said projecting portion is dimensioned and arranged to impart, when in said diverging position and upon actuation of said positioning element, joining forces on an interior surface of the first structural element at three or more radially equidistant regions isolated from the periphery of the opening without imparting forces on the interior surface of the first structural element at any point between an edge of the opening and said radially equidistant regions, wherein the projecting portion of the anchoring assembly is sufficiently rigid as to restrict further movement of the base portion toward the face plate when the projecting portion initially contacts the first structural element, despite continued actuation of the positioning element, and wherein the projecting portion is sufficiently rigid as to prevent displacement of distal regions of the anchoring assembly from initial positions of contact with the first structural element despite progressive exertion of a pulling force on the anchoring assembly by the positioning element.

24. The fastener assembly of claim 23, further including a spacer element secured to said faceplate and insertable into the opening to thereby restrict movement of said face plate relative to the opening.

25. The fastener assembly of claim 23, wherein said elongated members are interconnected by lateral stiffeners, each elongated member extending from said base portion and having a tip portion defining a respective radially equidistant region of contact with the first structural member.

26. The fastener assembly of claim 23, wherein said positioning element is dimensioned and arranged to extend from said base portion and through said opening and said apertured face plate.

27. The fastener assembly of claim 26, wherein said base portion defines a threaded, central aperture and wherein said positioning element comprises a threaded member, whereby axial movement of the anchoring assembly relative to the face plate is achieved by rotation of the threaded member.

28. The fastener assembly of claim 26, wherein said positioning element comprises an elongated member defining a plurality of teeth, said fastener assembly further including a retaining structure, aligned with said face plate aperture, defining complementary teeth engageable with said elongated member so as to permit movement of the anchoring assembly toward the face plate while preventing movement in the opposite direction.

29. The fastener assembly of claim 26, wherein said positioning element comprises an elongated member defining a plurality of teeth and wherein said face plate defines complementary teeth, aligned with said face plate aperture, engageable with said elongated member so as to permit movement of the anchoring assembly toward the face plate while preventing movement in the opposite direction.

30. The fastener assembly of claim 23, further including a tubular body secured to said face plate, said tubular body being dimensioned for insertion into the opening in said first structural element and having an end wall defining an aperture dimensioned to accommodate insertion of said positioning element.

31. The fastener assembly of claim 23, further including a tubular body secured to said face plate, said tubular body having at least one sidewall defining a plurality of slots equal in number to the number of radially equidistant regions of contact defined by the projecting portion.

32. The fastener assembly of claim 23, further comprising camming means engageable with said projecting portion for causing said projecting portion to spread into said diverging position upon actuation of said positioning element.

33. The fastener assembly of claim 23, wherein said faceplate defines at least one threaded opening dimensioned and arranged to receive a correspondingly threaded fastener passing through an opening in the second structural element.

34. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion being manipulable between a folded position facilitating insertion through the opening in the first structural element and a diverging position preventing withdrawal of the anchoring member through the opening and comprising at least three elongated, outwardly moveable wing members, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force.

35. The anchoring assembly of claim 34, further including a positioning element for exerting said pulling force, said positioning element being dimensioned and arranged to extend from said base portion and through said opening.

36. The anchoring assembly of claim 35, wherein said base portion defines a threaded, central aperture and wherein said positioning element comprises a threaded member, whereby axial movement of the anchoring assembly relative to the first structural element is achieved by rotation of the threaded member.

37. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, projecting portion, extending in an axial direction from said base portion, for imparting joining forces on an interior surface of the first structural element at three or more radially equidistant regions isolated from the periphery of the opening without imparting forces on the interior surface of the first structural element at any point between an edge of the opening and said radially equidistant regions, said projecting portion comprising at least three elongated, outwardly moveable wing members manipulable between a folded position facilitating insertion through the opening in the first structural element and a diverging position preventing withdrawal of the anchoring member through the opening, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, wherein said elongated outwardly moveable wing members are interconnected by lateral stiffeners, each elongated member extending from said base portion and having a tip portion defining a respective radially equidistant region of contact with the first structural member.

38. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, projecting portion, extending in an axial direction from said base portion, for imparting joining forces on an interior surface of the first structural element at three or more radially equidistant regions isolated from the periphery of the opening without imparting forces on the interior surface of the first structural element at any point between an edge of the opening and said radially equidistant regions, said projecting portion comprising at least three elongated, outwardly moveable wing members manipulable between a folded position facilitating insertion through the opening in the first structural element and a diverging position preventing withdrawal of the anchoring member through the opening, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, said anchoring assembly of further comprising a positioning element for exerting said pulling force, said positioning element being dimensioned and arranged to extend from said base portion and through said opening, wherein said positioning element comprises an elongated member defining a plurality of teeth, said anchoring assembly further including a retaining structure, alignable with the opening in the first structural element, defining complementary teeth engageable with said elongated member and dimensioned so as to permit movement of the anchoring assembly toward the face plate while preventing movement in the opposite direction.

39. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion comprising at least three elongated, outwardly moveable wing members manipulable between a folded position facilitating insertion through the opening in the first structural element and a diverging position preventing withdrawal of the anchoring member through the opening, said wing members comprising tip portions that impart joining forces on an interior surface of the first structural element at three or more radially equidistant regions isolated from the periphery of the opening without imparting forces on the interior surface of the first structural element at any point between an edge of the opening and said radially equidistant regions, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, wherein said elongated outwardly moveable wing members are interconnected by lateral stiffeners, each elongated member extending from said base portion and having a tip portion defining a respective radially equidistant region of contact with the first structural member.

40. An anchoring assembly insertable through an opening defined in a first structural element to be joined to a second structural element, said anchoring assembly being positionable into contact with the first structural element by exertion of a pulling force through an opening in at least one of the first and second structural element and comprising:

a base portion, a projecting portion extending in an axial direction from said base portion, said projecting portion comprising at least three elongated, outwardly moveable wing members manipulable between a folded position facilitating insertion through the opening in the first structural element and a diverging position preventing withdrawal of the anchoring member through the opening, said wing members comprising tip portions that impart joining forces on an interior surface of the first structural element at three or more radially equidistant regions isolated from the periphery of the opening without imparting forces on the interior surface of the first structural element at any point between an edge of the opening and said radially equidistant regions, said joining forces being imparted when said wing members are in said diverging position and upon exertion of the pulling force, wherein the projecting portion of the anchoring assembly is sufficiently rigid as to restrict further movement of the base portion toward the first structural member when the projecting portion initially contacts the first structural element, despite progressively increased exertion of the pulling force, and wherein the projecting portion of the anchoring assembly is sufficiently rigid as to prevent displacement of distal regions of the anchoring assembly from their initial positions of contact with the first structural element despite progressively increased exertion of the pulling force, said anchoring assembly further comprising a positioning element for exerting said pulling force, said positioning element being dimensioned and arranged to extend from said base portion and through said opening, wherein said positioning element comprises an elongated member defining a plurality of teeth, said anchoring assembly further including a retaining structure, alignable with the opening in the first structural element, defining complementary teeth engageable with said elongated member and dimensioned so as to permit movement of the anchoring assembly toward the face plate while preventing movement in the opposite direction.

* * * * *